(12) United States Patent
Lee et al.

(10) Patent No.: US 6,207,254 B1
(45) Date of Patent: Mar. 27, 2001

(54) PARTIALLY PERFORATED FOAM

(75) Inventors: Shau-Tarng Lee, Oakland, NJ (US); Maurizio Brandolini, Milan (IT)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 09/238,989

(22) Filed: Jan. 28, 1999

(51) Int. Cl.[7] .................................................. B32B 3/12
(52) U.S. Cl. ......................................... 428/159; 428/316.6
(58) Field of Search ............................... 428/159, 316.6

(56) References Cited

U.S. PATENT DOCUMENTS

| 5,424,016 | 6/1995 | Kolosowski . | |
|---|---|---|---|
| 5,585,058 | 12/1996 | Kolosowski . | |
| 5,667,728 | 9/1997 | Lee . | |
| 5,776,390 | 7/1998 | Fiddelaers et al. . | |
| 5,962,107 | * 10/1999 | Lowery et al. | ....................... 428/131 |

FOREIGN PATENT DOCUMENTS

| 4-307227 | 10/1992 | (JP) . |
|---|---|---|
| 4-314529 | 11/1992 | (JP) . |

* cited by examiner

*Primary Examiner*—Terrel Morris
*Assistant Examiner*—Ula C. Ruddock
(74) *Attorney, Agent, or Firm*—Lerner,David,Littenberg, Krumholz & Mentlik, LLP

(57) ABSTRACT

A method for accelerating the release of a flammable blowing agent from an expanded foam is disclosed. According to the method, an expanded foam structure is perforated to form a first series of channels extending partially through its thickness from a first surface and a second series of channels extending partially through its thickness from a second surface opposite the first surface. The channels provide paths enabling the blowing agent to escape more rapidly from the interior of the expanded foam structure.

7 Claims, 1 Drawing Sheet

PARTIALLY PERFORATED FOAM

FIELD OF THE INVENTION

The present invention relates to expandable foams, and more particularly to extruded expandable foams, such as those used for packaging. Still more particularly, the present invention is directed to methods for producing expanded foam structures so as to accelerate the release of blowing agents therefrom.

BACKGROUND OF THE INVENTION

Expandable foam products, which find use as packaging, cushioning, insulating and structural materials, typically consist of a phase of open or closed pores or cells dispersed throughout a polymer matrix. A wide array of processes have been devised for developing the cell phase in these products, including adding a gaseous "blowing agent" to the polymer during processing, producing a gaseous blowing agent by chemical reaction within the polymer during processing, and forming the product from polymer granules to obtain a cellular structure. In one particularly popular process, a gaseous blowing agent is incorporated into a molten thermoplastic material to form a mixture which may then be molded to a desired shape, such as by extrusion. After molding, applied heat or reduced pressure causes the blowing agent to expand, forming a cellular structure within the thermoplastic matrix. The effectiveness of a particular blowing agent will depend largely upon the polymer composition in which it is incorporated, the method of incorporation, the process conditions, the additives used, and the products sought.

Blowing agents work by expanding the polymer to produce a cellular structure having far less density than the polymer itself. In processes in which a blowing agent is incorporated into a molten thermoplastic polymer, bubbles of gas form around "nucleation sites" and are expanded by heat or reduced pressure. A nucleation site is a small particle or a conglomerate of small particles that promotes the formation of a gas bubble in the polymer. Additives may be incorporated into the polymer to promote nucleation for a particular blowing agent and, consequently, a more uniform pore distribution.

Once bubbles of the blowing agent have expanded to form the cellular structure, the structure is maintained by replacing the blowing agent in the cells with air. Diffusivity of the blowing agent out of the cells relative to air coming into the cells impacts the stability of the foam over time and whether the cells of the foam may collapse. Additives may be incorporated into the polymer and process conditions may be adjusted to assist in controlling the diffusivity of the blowing agent, to promote foam stability, and to limit collapse of the foam to acceptable limits.

Many methods are available for adding a blowing agent to a polymer during processing to produce a foam. In one method pertinent to the present invention, the blowing agent is mixed with a molten thermoplastic polymer under pressure, and the mixture is then extruded through a forming die into a zone of reduced pressure. Shaped extruded foams may be produced by this method using a forming die of a desired configuration. Plank, which can be cut to a desired shape, and thin foam sheets may also be produced in this manner.

Prior art processes for forming expanded foam products from thermoplastic polymers typically used halogenated hydrocarbons as blowing agents. The halogenated hydrocarbons include the chlorofluorocarbons ("CFCs") and hydrochlorofluorocarbons ("HCFCs"). CFCs and HCFCs are readily impregnable in thermoplastic polymers and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs and other halogenated hydrocarbons typically are either not flammable or are of low flammability, which greatly reduces the care with which they may be used. These compounds have the further advantage of low toxicity. However, CFCs, HCFCs and other halogenated hydrocarbons have been linked to ozone depletion in the atmosphere. As a result of concern over the ozone layer, the use of these materials is being phased out in favor of materials which are more friendly to the ozone layer, such as hydrocarbons.

Although hydrocarbons are readily available, inexpensive and very compatible with polyethylene and other polymer matrix materials, thereby permitting wide processing variability, they present their own unique problems. Foremost among these problems is the greater flammability of these materials. Other problems with hydrocarbon blowing agents may include toxicity or environmental incompatibility. Moreover, the hydrocarbon blowing agents are slow to permeate through the expanded foam structure, such that the flammability and other problems associated with these materials persist in the foam structures for longer periods of time. Safety concerns have therefore mandated that manufacturers of these products store them for excessively long periods of time to enable the blowing agents therein to dissipate to levels below their lowest explosive limit so that the products are safe enough to be shipped to and used by customers.

The problems associated with the use of hydrocarbon blowing agents would be minimized if a majority of the blowing agent could be removed from the expanded foam structure as quickly as possible. Although attempts have been made in the past to do just that, these attempts have proven to be unsatisfactory. Thus, in U.S. Pat. Nos. 5,424, 016 and 5,585,058 to Kolosowski, an expanded foam structure is perforated with a multiplicity of channels extending from one surface of the structure to the opposite surface. These channels shorten the path through which the blowing agent must travel to be diffused from the interior of the structure to the atmosphere. However, these channels also decrease the mechanical properties of the foam, including its compression strength, resistance to creep, cushioning ability and the like. U.S. Pat. No. 5,776,390 to Fiddelaers et al. also teaches perforating an extruded foam in order to facilitate the dissipation of the blowing agent. In this method, however, the perforations are made from one side of the foam and extend through only about 60–97 percent of the foam thickness so as to avoid removal of the surface skin from the foam. The problem with this approach, however, is that perforating from a single side while the foam is still hot causes residual stresses to develop in the foam, thus resulting in foam warpage.

Despite the efforts that have been made in the past, there remains a need for production methods which will accelerate the removal of a majority of the blowing agent from the expanded foam structure without detrimentally affecting its resulting strength, cushioning properties or overall foam quality.

SUMMARY OF THE INVENTION

The present invention addresses these needs.

One aspect of the present invention provides methods for accelerating the release of blowing agents from expanded foam structures. In accordance with these methods, an expanded foam structure is provided with the blowing agent therein, the foam structure having first and second surfaces separated by a predetermined dimension. The foam structure is perforated to form a first series of channels extending from the first surface toward the second surface, and to form a second series of channels extending from the second surface toward the first surface. The first and second series of channels each may have a length of up to about 50% of the predetermined dimension. Preferably, the first series of channels extends substantially perpendicular to the first surface and the second series of channels extends substantially perpendicular to the second surface. The methods of the invention may be used to perforate foams having a thickness of about 12 mm or greater.

In preferred embodiments, the length of the first series of channels is between about 30% and about 50% of the predetermined dimension. In more preferred embodiments, the length of the second series of channels is also between about 30% and about 50% of the predetermined dimension.

Desirably, each of the channels in the first series of channels is spaced from an adjacent channel in the first series of channels by between about $\frac{1}{12}$ and $\frac{1}{2}$ of the predetermined dimension. Each of the channels in the second series of channels preferably is spaced from an adjacent channel in the second series of channels by an amount within the same range. In highly preferred embodiments, each of the channels in the second series of channels has a position offset in the length and width directions of the foam from the channels in the first series of channels.

In preferred methods, the expanded foam structure may be formed by extruding through a die a mixture including a polymer and a blowing agent, and the perforation procedure may be performed between about 40 minutes and about 90 minutes after extrusion. Perforating at about 50 minutes after extrusion is most preferred.

Another aspect of the present invention provides an expanded foam structure comprising a body including a polymer matrix and a blowing agent dispersed in a multiplicity of cells throughout the matrix, the body having first and second surfaces separated by a predetermined dimension; a first series of channels extending from the first surface toward the second surface, and a second series of channels extending from the second surface toward the first surface, the first and second series of channels having a length of up to about 50 percent of the predetermined dimension. Preferably, the first series of channels extends substantially perpendicular to the first surface and the second series of channels extends substantially perpendicular to the second surface.

In preferred embodiments hereof, the length of the first series of channels is between about 30% and about 50% of the predetermined dimension, and most preferably, the length of the second series of channels is also between about 30% and about 50% of the predetermined dimension.

In further preferred embodiments hereof, each of the channels in the first series of channels is spaced from an adjacent channel in the first series of channels by between about $\frac{1}{12}$ and about $\frac{1}{2}$ of the predetermined dimension. Desirably, each of the channels in the second series of channels is spaced from an adjacent channel in the second series of channels by an amount within the same range. In highly preferred embodiments of the foam structures, each of the channels in the second series of channels has a position offset in the length and width directions of the foam from the channels in the first series of channels.

BRIEF DESCRIPTION OF THE DRAWINGS

A more complete appreciation of the subject matter of the present invention and the various advantages thereof can be realized by reference to the following detailed description, in which reference is made to the accompanying drawings, in which.

BRIEF DESCRIPTION OF THE PREFERRED EMBODIMENTS

Figure 1:
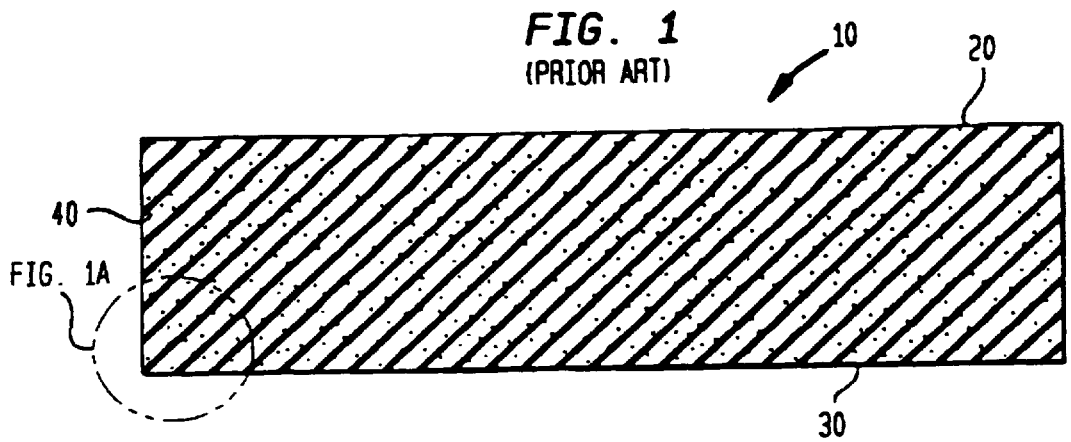
FIG. 1 is a highly schematic cross-sectional view of a foam structure prior to perforating.
Figure 1A:
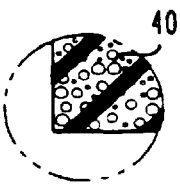
FIG. 1A is an enlarged detailed view showing the gas cells dispersed throughout the polymer matrix.

Preferred processes for forming expanded foams according to the present invention generally include the steps of (1) providing a mass of a polymer in a flowable state; (2) incorporating a blowing agent in the polymer mass; (3) forming the polymer/blowing agent mixture to a desired shape; (4) expanding the blowing agent to form a foam structure consisting of a phase of pores or cells dispersed throughout a polymer matrix; (5) solidifying the foam structure; and (6) perforating the foam structure to facilitate the release of the blowing agent therefrom. Polymers, additives and blowing agents useful in the present invention, as well as methods for combining these materials and forming same into expanded foam structures, are well known in the art and include those disclosed in commonly assigned U.S. Pat. No. 5,667,728 and pending U.S. patent application Ser. No. 08/940,366, filed Sep. 30, 1997, the disclosures of which are hereby incorporated by reference herein.

The polymers which may be used in the present invention include any foamable thermoplastic or thermosetting materials, including blends of two or more thermoplastic materials, blends of two or more thermosetting materials, or blends of thermoplastic materials with thermosetting materials. Suitable polymers include polystyrene, polyolefins, polyurethanes, polyesters including polyethylene terephthalate, and polyisocyanurates, with polyolefins being particularly preferred. Polyolefins are thermoplastic polymers derived from unsaturated hydrocarbons containing the ethylene or diene functional groups. Although the polyolefins may include virtually all of the addition polymers, the term polyolefin ordinarily refers to polymers of ethylene, the alkyl derivatives of ethylene (the alphaolefins), and the dienes. Among the more commercially important polyolefins are polyethylene, polypropylene, polybutene, and their copolymers, including ethylene/alpha-olefin copolymers such as linear low density polyethylene, and blends of the foregoing materials. Polyethylene is particularly useful in the practice of the present invention.

Polyethylene is a whitish, translucent polymer of moderate strength and high toughness which is available in varieties ranging in crystallinity from 20 to 95 percent, and in ultra low, low, medium and high density polymer forms. The low density material has a softening temperature between about 95° C. and about 115° C., while the high density material has a softening temperature between about 130° C. and about 140° C. Low, medium and high density polyethylenes and mixtures thereof are suitable for extrusion forming.

The present invention may utilize any of the known blowing agents, including fluorocarbons; hydrofluorocarbons; chlorofluorocarbons; hydrochlorofluorocarbons; alkylhalides, such as methyl chloride and ethyl chloride; and hydrocarbons. Other suitable blowing agents may include pristine blowing agents such as air, carbon dioxide, nitrogen, argon, water and the like. The blowing agent may consist of a mixture of two or more of any of the blowing agents set forth above. Other suitable blowing agents may also include chemical blowing agents such as ammonium and azotype compounds, including ammonium carbonate, ammonium biocarbonate, potassium biocarbonate, diazoaminobenzene, diazoaminotoluene, azodicarbonamide, diazoisobutyronitrile, and the like.

Preferred blowing agents in accordance with the present invention are hydrocarbons, including butane, isobutane, pentane, isopentane, hexane, isohexane, heptane, propane and the like, including combinations of two or more of these materials. A particularly preferred blowing agent for use with polyethylene is isobutane.

Although the blowing agent may be flammable or nonflammable, the methods of the present invention are particularly useful with flammable blowing agents because of the accelerated release of the blowing agent that they provide. As used herein, a flammable blowing agent is one that has a lowest explosive limit as determined by the ASTM 681-85 test. Flammable blowing agents include the alkylhalides, alkanes and alkenes described above.

In addition to the polymer and the blowing agent, the mixtures for forming the foam structures of the present invention may include one or more additives for enhancing the properties of the foam and the forming process. For example, elastomeric components such as polyisobutylene, polybutadene, ethylene/propylene copolymers, and ethylene/propylene diene interpolymers may be incorporated in the mixture. Other potential additives include crosslinking agents, extrusion aids, antioxidants, colorants, pigments, etc. as desired, all of which are conventional in the art.

The mixture may also include one or more permeability modifiers for controlling the replacement of the blowing agent in the cells of the foam with air while preventing substantial shrinkage of the foam structure from premature excessive loss of the blowing agent. Suitable permeability modifiers include fatty acid esters and amides such as glycerol monostearate and stearyl stearamide. The permeability modifier is used in an amount sufficient to produce a desirable rate of exchange of air with blowing agent in the cells of the foam. This amount is generally dictated by the polymer matrix material, the blowing agent composition and quantity, processing conditions, etc. For mixtures in which the polymer is polyethylene and the blowing agent is isobutane, a glycerol monostearate permeability modifier may be mixed with the polyethylene, preferably prior to melting, in an amount from about 0.3 to about 5 percent by weight of the polyethylene. Glycerol monostearate additions of about 0.3 to about 1.5 percent by weight of the polyethylene are preferred. On the other hand, where the polymer is polypropylene, permeability modifiers are not typically needed, but may be used in appropriate quantities to reduce friction induced static in the polymer and foams.

A nucleation agent may also be added to the mixture to promote nucleation and to control cell development and size. Preferred nucleating agents include low activity metal oxides, such as zinc oxide, zirconium oxide and talc; sodium bicarbonate/citric acid blends, such as those available under the trademark Hydrocerol from Boehringer Ingelheim of Winchester, Va.; and other materials known in the art. The amount of nucleating agent added to the mixture will depend upon the composition and activity of the nucleating agent, the composition of the polymer matrix material, the blowing agent composition and quantity, and processing conditions, as well as upon the pore size and pore density desired in the expanded foam. Sodium bicarbonate/citric acid nucleating agents preferably are added in an amount of from about 0 to 0.8 percent by weight of the polymer. For polyethylene/isobutane mixtures, additions of such nucleating agents in amounts between about 0.05 and 0.50 percent by weight of polyethylene are preferred. Talc, which is less active, is preferably added as a nucleating agent in an amount of from about 0 to 2 percent by weight of the polymer, with additions of between about 0.2 and 1.0 percent by weight of polyethylene being preferred in polyethylene/isobutane mixtures.

Once the polymer and additives have been selected, these materials are mixed together to form a mixture. This may be accomplished in a conventional batch mixing step. Alternatively, where the foam structures are to be formed by extrusion, pellets of a thermoplastic polymer may be placed in the hopper of an extruder. Any nucleating agents, permeability modifiers and/or other additives may be added to the hopper and combined in a solid state with the polymer pellets to form a homogenous mixture. Intimate mixing of these components is important to assure uniform pore distribution throughout the extruded foam as well as uniform blowing agent dissipation from the expanded foam. The solid mixture may then be conveyed to the melt zone of the extruder in which the mixture is thoroughly melted. The mixture should be brought to a high enough temperature above its melting point to have sufficient fluidity for mixing with the blowing agent. Temperatures which are between about 20° C. and about 100° C. above the melting point of the polymer are preferred. The melt zone may be maintained at a somewhat lower temperature due to the heat that is generated by friction as the melted mixture flows through the extruder.

The melted mixture may then be metered to a mixing zone where it is mixed with the blowing agent under pressure. The blowing agent typically is injected between the metering and mixing zones, and through either a single port or multiple ports, using high pressure pumps. Where the blowing agent includes more than one component, the components may be injected separately through multiple ports or in combination through a single port. When injected, the blowing agent initially forms a dispersion of insoluble bubbles within the melted thermoplastic mass. These bubbles eventually dissolve in the thermoplastic mass as the mixing continues and the pressure increases down the length of the extruder. Desirably, the extruder has a length to diameter ratio of at least 30:1 and a mixing zone with a sufficient length to ensure that a homogenous mixture is formed. In this regard, single screw extruders may be used in processes according to the present invention, although double screw extruders may be used for greater mixing. Double screw extruders may be either twin screw, in which the mixture passes through two screws arranged parallel to one another, or tandem screw, in which the mixture passes through two screws arranged in series.

The blowing agent generally is added to the molten polymer in amounts of between about 5 and about 15 percent by weight of the polymer. For polyethylene/isobutane mixtures, the isobutane preferably is added in amounts of between about 6 and about 10 percent by weight of polyethylene for thicker grades of foam. Where lower density foams are desired, greater amounts of blowing agent are typically added. Thus, the maximum useful proportion of blowing agent in the molten mass is density related. The quantity of blowing agent also is related to the pressure that is maintained on the molten polymer/blowing agent mixture in the extrusion die passage.

After mixing, the temperature of the polymer/blowing agent mixture should be lowered to a temperature which is closer to its melting point so that the blowing agent does not readily escape from the polymer upon expansion, thereby enabling the polymer to maintain its structure upon foaming. However, overcooling of the mixture may hinder complete expansion of the foam, and therefore should be avoided. The blowing agent has a plasticizing effect on the polymer mixture, reducing its viscosity or resistance to flow, and so the melting point of the polymer/blowing agent mixture ordinarily is below that of the polymer alone. The expansion temperature, which is above the melting point of the polymer/blowing agent mixture, may be empirically determined and depends upon the composition of the polymer, the length of the extruder screw, whether single or double screws are used, and on the composition and amount of the blowing agent. For a low density polyethylene, the expansion temperature generally will be in the range of between about 85° C. and about 120° C.

When cooled to the appropriate temperature, the polymer/blowing agent mixture may be extruded through a shaped die having dimensions selected to produce an expanded foam sheet or plank having desired dimensions. Within the die, the mixture is under high pressure which prevents the foam from expanding. As it exits the die, however, the mixture is exposed to a low pressure environment, such as atmospheric pressure. This sudden drop in pressure causes bubble expansion or foaming of the structure. An expanded foam structure 10 existing at this point in the process is shown in FIG. 1. Foam structure 10 has a top surface 20, a bottom surface 30 generally parallel to the top surface, and a plurality of pores or cells 40 dispersed throughout the polymer matrix. Immediately after cell formation, cells 40 are filled almost entirely with the blowing agent, in this case isobutane.

Figure 2:
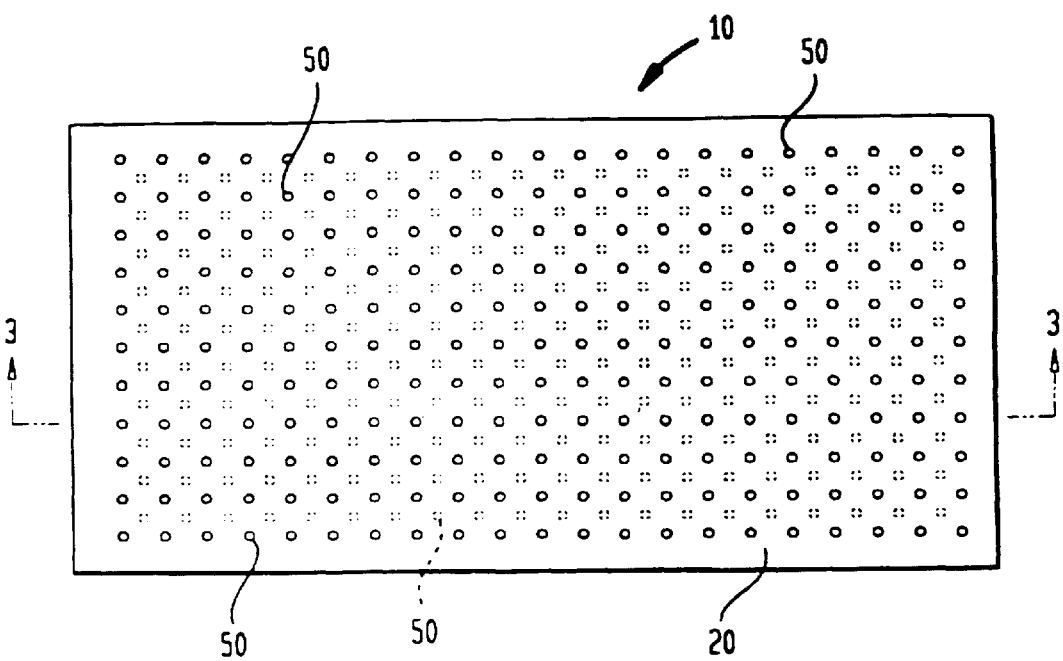
FIG. 2 is a highly schematic top plan view of a foam structure perforated in accordance with the present invention.
Figure 3:
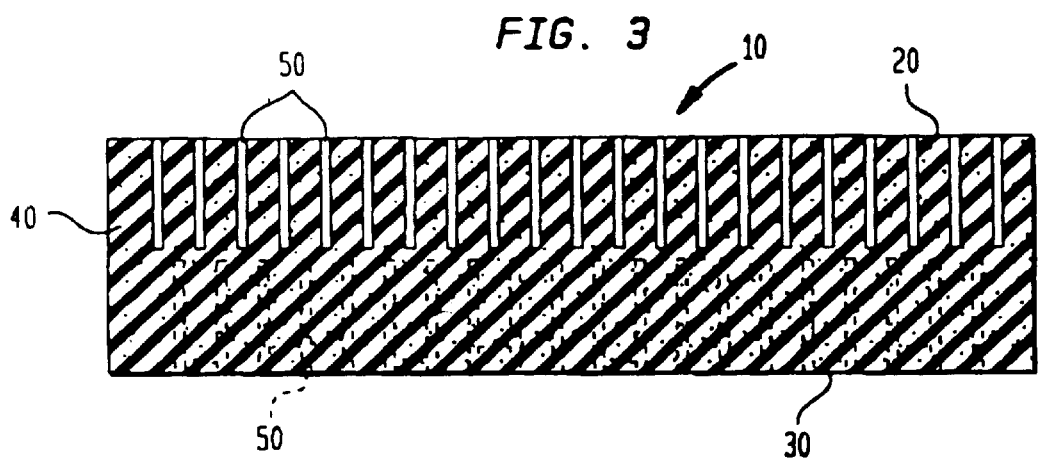
FIG. 3 is a highly schematic cross-sectional view taken along line 3—3 of FIG. 2.

In order to facilitate the diffusion of the blowing agent from cells 40, the present invention follows the foam expansion step with a cooling step and then a perforation step. Cooling generally occurs under ambient conditions at least until the polymer in the foam has solidified sufficiently so that the polymer matrix is not overly distorted upon perforation. In the perforation step, the foam structure is punctured to form a multiplicity of channels 50 extending partially across the structure from surface 20 toward surface 30, and partially across the structure from surface 30 toward surface 20. A perforated foam structure in accordance with the present invention is shown in FIGS. 2 and 3. Perforation may be accomplished by puncturing the foam with a multiplicity of pointed, sharp objects in the nature of needles, pins, spikes, nails or the like. This may be accomplished in a continuous process in which the needles or other sharp objects are arranged in a predetermined pattern on the surfaces of a pair of opposed rollers. The expanded foam may be guided between the rollers, whereupon the rotation of the rollers causes the needles to penetrate surfaces 20 and 30 of the foam to form channels 50 therein. This process may result in enlarging of channels 50 as a result of the angular movement of the needles relative to the foam. In an alternate process, a pair of plates, one arranged on each side of the foam, may include one or more rows of needles. The plates may be moved toward surfaces 20 and 30 of the foam either simultaneously or alternately to form channels 50 within the foam. To minimize distortion of the channels as the foam is being perforated, the plates of needles may be driven in the movement direction of the foam at the same speed as the foam is traveling. Upon retraction from the foam, the plates of needles may be moved in an opposite direction back to the starting position.

Channels 50 may have any cross-sectional shape, including circular, oval, square, rectangular or other polygonal configuration. Preferably, channels 50 have a diameter or corresponding cross-sectional size of between about 0.01 and about 3.0 mm, and are uniformly dispersed over surfaces 20 and 30, with the spacing between adjacent channels being based upon the foam thickness, t. Channel spacings of between about t/12 and about t/2 on each side of the foam are preferred.

The depth of channels 50 is an important feature of the present invention. Thus, channels 50 preferably have a depth between about 25 percent and about 50 percent of the thickness of foam 10. The depth of channels 50 may be controlled by controlling the depth to which the needles penetrate the foam. This may be accomplished by controlling the length of the puncturing needles. Penetration depth may also be controlled, in the case of opposed rollers, by adjusting the distance between the rotation axes of the rollers, and in the case of opposed needle plates, by controlling the amount of movement of the plates toward foam surfaces 20 and 30.

Although channels 50 are depicted in the figures as being oriented substantially perpendicular to the extrusion or elongation direction of foam 10, this need not be the case. Thus, channels 50 may be formed at an oblique angle relative to the extrusion direction. Angles of between about 30° and about 120° relative to the extrusion direction are preferred, with angles of about 90° being most preferred.

As noted above, the perforation step is conducted after a cooling step which is sufficient in length to enable the foam structure to achieve adequate internal stability. If the foam is perforated too soon, the elastic nature of the polymer may cause the cells opened by the perforation procedure to close. On the other hand, if too long a period of time elapses before perforation, the perforation procedure may have a more damaging affect on the foam properties adjacent the puncture sites. Preferably, the perforation procedure is performed between about 40 minutes and about 90 minutes after initiation of free foam expansion. Performing the perforation step at about 50 minutes after the initiation of free foam expansion is most preferred.

Certain features of the present invention as described above are illustrated in the following examples.

EXAMPLE 1

A low density polyethylene resin having a melt index of 2 and a density of 0.918 g/cm$^3$ (Novacor 219a available from Nova of Calgary, Alberta, Canada) was combined in the feed zone of the primary extrusion chamber in a tandem extruder with 0.2 wt % of a sodium bicarbonate/citric acid nucleating agent available from Boehringer Ingelheim under the name Hydrocerol CF20. The components were intimately mixed to form a homogenous polymer mixture. The mixture was then conveyed to the melt zone of the extruder and heated to a temperature of about 190° C. to form a molten mass. About 6–7 wt % (based on the weight of the resin) of an isobutane blowing agent was injected into the molten mass using a metering and pumping unit, and mixing continued to form a homogenous blowing agent/polymer mixture. This mixture was then conveyed to the secondary extrusion chamber in which it was cooled to a temperature of about 115° C. Once stabilized, the mixture was extruded through a die and expanded to form a foam plank having a thickness of about 5.4 cm and a width of about 134 cm. The foam plank was then conveyed under ambient conditions to a cutting station and cut into lengths of about 2.8 meters. After predetermined cooling periods, the foam planks were perforated with needles to form channels generally circular in cross-section with a diameter of about 1 mm. Perforations were made through about 50 percent of the foam thickness from one side, through about 50 percent of the foam thickness from two sides, through about 75 percent of the foam thickness from one side, and entirely through the thickness of the foam. The channels were formed in a square pattern every 0.8 cm, with the channels on one side of the foam plank offset in the length and width directions from the channels on the other side of the foam plank by one-half of the distance between the channels so that each channel on one side of the foam plank was positioned in approximately the center of a square formed by four channels on the other side of the foam plank.

After a period of 14 days following foam production, each foam sample was tested to determine its density, compressive strength and residual gas content. Compressive strength measurements were made to determine the force required to compress the foam by 25 percent and 50 percent of its initial thickness both before and after die cutting (ADC). In the ADC procedure, the foam plank was first compressed to about 20 percent of its initial thickness to simulate a die cutting procedure and then released. Measurements were then made to determine compressive strength at 25 percent compression and 50 percent compression, whichever had been performed initially. Retention is determined by dividing the compressive strength after die cutting by the compressive strength before die cutting, with higher retention values being preferred. Residual gas measurements were made at approximately the center of the foam planks using a hand held hydrocarbon sniffer with a stick nozzle inserted to the point of measurement.

Tables 1–3 below show the test results for samples perforated at 30 minutes, 50 minutes and 120 minutes, respectively, after free foam expansion.

TABLE 1

| Depth of perforation | 0 | 50% (1 side) | 50% (2 sides) | 75% (1 side) | 100% |
|---|---|---|---|---|---|
| Time to perforation (min) | N/A | 30 | 30 | 30 | 30 |
| Density (lb/ft³) | 2.32 | 2.29 | 2.29 | 2.27 | 2.30 |
| Compressive strength (psi) | | | | | |
| 25% | 12.1 | 13.2 | 12.8 | 12.7 | 10.2 |
| ADC | 9.3 | 9.5 | 8.9 | 9.5 | 6.5 |
| Retention | 77% | 72% | 70% | 75% | 64% |
| 50% | 20.7 | 22.1 | 21.1 | 21.4 | 18.4 |
| ADC | 18.5 | 18.6 | 17.2 | 18.6 | 14.8 |
| Retention | 89% | 84% | 82% | 87% | 80% |
| Residual gas (vol %) | 10 | 10 | 5 | 5 | 1.2 |

TABLE 2

| Depth of perforation | 0 | 50% (1 side) | 50% (2 sides) | 75% (1 side) | 100% |
|---|---|---|---|---|---|
| Time to perforation (min) | N/A | 50 | 50 | 50 | 50 |
| Density (lb/ft³) | 2.24 | 2.20 | 2.20 | 2.20 | 2.26 |
| Compressive strength (psi) | | | | | |
| 25% | 11.9 | 12.9 | 12.5 | 12.3 | 10.0 |
| ADC | 9.2 | 9.8 | 9.3 | 9.5 | 7.3 |
| Retention | 77% | 76% | 75% | 78% | 73% |
| 50% | 20.4 | 21.5 | 20.7 | 20.9 | 18.1 |
| ADC | 18.4 | 19.0 | 18.0 | 18.6 | 15.1 |
| Retention | 90% | 89% | 87% | 89% | 84% |
| Residual gas (vol %) | 8 | 11 | 5 | 5 | 1 |

TABLE 3

| Depth of perforation | 0 | 50% (1 side) | 50% (2 sides) | 75% (1 side) | 100% |
|---|---|---|---|---|---|
| Time to perforation (min) | N/A | 120 | 120 | 120 | 120 |
| Density (lb/ft³) | 2.24 | 2.20 | 2.21 | 2.21 | 2.28 |
| Compressive strength (psi) | | | | | |
| 25% | 12.0 | 12.7 | 12.5 | 12.1 | 9.5 |
| ADC | 9.3 | 9.6 | 9.1 | 9.3 | 7.1 |
| Retention | 78% | 76% | 73% | 77% | 75% |
| 50% | 20.5 | 21.2 | 20.6 | 20.8 | 17.8 |
| ADC | 18.5 | 18.7 | 17.6 | 18.4 | 15.0 |
| Retention | 90% | 88% | 85% | 88% | 84% |
| Residual gas (vol %) | 8 | 10 | 5 | 7 | 1 |

As shown in Tables 1–3, regardless of the time at which perforation was performed, the compressive strength of the foam planks perforated halfway through their thickness from both sides was only marginally less than the compressive strength of the foam planks perforated halfway through their thickness from one side, yet yielded substantially lower residual gas volumes. Furthermore, perforating 50 percent through the thickness of the foam planks from both sides, while yielding somewhat higher residual gas volumes, also yielded significantly higher compressive strengths before and after a die cut procedure at both 25 percent and 50 percent compression levels than were achieved when perforations were made entirely through the thickness of the foam plank.

EXAMPLE 2

The same materials and substantially the same method as described in Example 1 were used to make a higher density foam plank. Thus, Novacor 219a polyethylene resin was mixed in a tandem extruder with 0.3 wt % of Hydrocerol CF20 nucleating agent. After melting at a temperature of about 190° C., the polymer was combined with about 5 wt % isobutane blowing agent to form a homogenous mixture. The mixture was cooled to a temperature of about 115° C. and extruded to form a foam plank having a thickness of about 5.4 cm and a width of about 66 cm. After being cut to lengths of about 2.8 meters and cooled for predetermined lengths of time, the planks were perforated in the manner described above.

At a period of 14 days following foam production, the density, compressive strength and residual gas content of the foam samples were determined. Tables 4–6 below show the test results for samples perforated at 30 minutes, 50 minutes and 120 minutes, respectively, after free foam expansion.

TABLE 4

| Depth of perforation | 0 | 50% (1 side) | 50% (2 sides) | 75% (1 side) | 100% |
|---|---|---|---|---|---|
| Time to perforation (min) | N/A | 30 | 30 | 30 | 30 |
| Density (lb/ft$^3$) | 4.7 | 4.64 | 4.62 | 4.65 | 4.61 |
| Compressive strength (psi) | | | | | |
| 25% | 16.9 | 18.8 | 18.7 | 19.0 | 16.7 |
| ADC | 12.3 | 12.9 | 12.6 | 13.4 | 12.1 |
| Retention | 73% | 69% | 68% | 71% | 72% |
| 50% | 28.3 | 30.3 | 30.0 | 31.7 | 29.1 |
| ADC | 24.6 | 24.5 | 23.8 | 25.4 | 23.4 |
| Retention | 87% | 81% | 79% | 80% | 80% |
| Residual gas (vol %) | 15 | 11 | 5 | 6 | 5 |

TABLE 5

| Depth of perforation | 0 | 50% (1 side) | 50% (2 sides) | 75% (1 side) | 100% |
|---|---|---|---|---|---|
| Time to perforation (min) | N/A | 50 | 50 | 50 | 50 |
| Density (lb/ft$^3$) | — | 4.7 | 4.68 | 4.68 | 4.64 |
| Compressive strength (psi) | | | | | |
| 25% | — | 18.8 | 19.5 | 18.7 | 16.5 |
| ADC | — | 12.7 | 13.4 | 13.1 | 11.5 |
| Retention | — | 67% | 69% | 70% | 70% |
| 50% | — | 30.7 | 31.7 | 31.6 | 28.9 |
| ADC | — | 24.4 | 25.2 | 24.9 | 22.2 |
| Retention | — | 80% | 80% | 79% | 77% |
| Residual gas (vol %) | — | 11 | 8 | 5 | 5 |

TABLE 6

| Depth of perforation | 0 | 50% (1 side) | 50% (2 sides) | 75% (1 side) | 100% |
|---|---|---|---|---|---|
| Time to perforation (min) | — | 120 | 120 | 120 | 120 |
| Density (lb/ft$^3$) | — | 4.66 | 4.64 | 4.66 | 4.69 |
| Compressive strength (psi) | | | | | |
| 25% | — | 19.4 | 20.6 | 19.4 | 17.1 |
| ADC | — | 12.8 | 12.8 | 12.8 | 12.2 |
| Retention | — | 66% | 62% | 66% | 71% |
| 50% | — | 31.5 | 32.9 | 31.8 | 29.5 |
| ADC | — | 24.2 | 23.8 | 24.2 | 23.8 |
| Retention | — | 77% | 72% | 76% | 81% |
| Residual gas (vol %) | — | 13 | 6 | 5 | 2 |

As shown in Tables 4–6, very little difference was found between the compressive strength of the foam planks perforated halfway through their thickness from both sides and the compressive strength of the foam planks perforated halfway through their thickness from one side, regardless of the amount of cooling before perforation. Nonetheless, foam planks perforated from both sides yielded significantly lower residual gas volumes than planks perforated halfway through their thickness from one side. Additionally, foam planks perforated halfway through their thickness from both sides, although exhibiting higher residual gas volumes, yielded consistently higher compressive strengths, both before and after die cutting, than foam planks perforated entirely through their thickness. It should also be noted that, for these higher density foams, planks perforated from one side, whether through 50% or 75% of their thickness, showed a tendency to warp when fully cooled.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. An expanded foam structure, comprising a body including a polymer matrix and a blowing agent dispersed in a multiplicity of cells throughout said matrix, said body having first and second surfaces separated by a predetermined dimension;

a first series of channels extending from said first surface toward said second surface, said first series of channels having a length of up to about 50 percent of said predetermined dimension; and a second series of channels extending from said second surface toward said first surface, said second series of channels having a length of up to about 50 percent of said predetermined dimension.

2. The foam structure as claimed in claim 1, wherein said first series of channels extends substantially perpendicular to said first surface and said second series of channels extends substantially perpendicular to said second surface.

3. The foam structure as claimed in claim 1, wherein said length of said first series of channels is between about 30 percent and about 50 percent of said predetermined dimension.

4. The foam structure as claimed in claim 3, wherein said length of said second series of channels is between about 30 percent and about 50 percent of said predetermined dimension.

5. The foam structure as claimed in claim 1, wherein each of said channels in said first series of channels is spaced from an adjacent channel in said first series of channels by between about $\frac{1}{12}$ and about $\frac{1}{2}$ of said predetermined dimension.

6. The foam structure as claimed in claim 5, wherein each of said channels in said second series of channels is spaced from an adjacent channel in said second series of channels by between about $\frac{1}{12}$ and about $\frac{1}{2}$ of said predetermined dimension.

7. The foam structure as claimed in claim 1, wherein each of said channels in said second series of channels has a position offset in the length and width directions of said body from said channels in said first series of channels.

* * * * *